(No Model.)
2 Sheets—Sheet 1.
T. D. MOWLDS.
INDIVIDUAL COFFEE URN OR PERCOLATOR.
No. 307,571.  Patented Nov. 4, 1884.
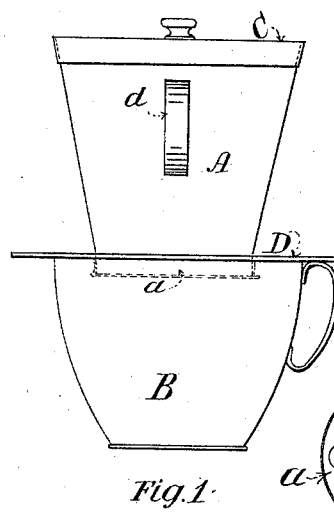
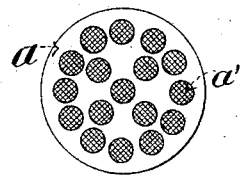
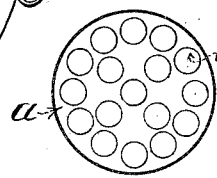
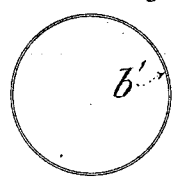
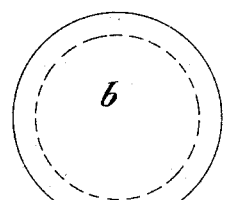
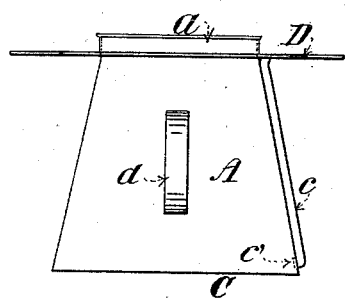
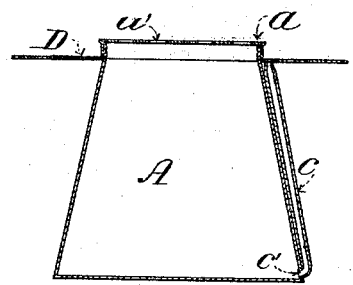
WITNESSES:
Fredk J. Lambert
John F. Bilsterling
INVENTOR
Thomas D. Mowlds (No Model.) 2 Sheets—Sheet 2.

T. D. MOWLDS.
INDIVIDUAL COFFEE URN OR PERCOLATOR.

No. 307,571. Patented Nov. 4, 1884.

WITNESSES: INVENTOR
John F Belsterling Thomas D. Mowlds
Fredk J. Lambert

UNITED STATES PATENT OFFICE.

THOMAS D. MOWLDS, OF PHILADELPHIA, PENNSYLVANIA.

INDIVIDUAL COFFEE URN OR PERCOLATOR.

SPECIFICATION forming part of Letters Patent No. 307,571, dated November 4, 1884.

Application filed March 25, 1884. (No model.)

*To all whom it may concern:*

Be it known that I, THOMAS D. MOWLDS, a citizen of the United States, residing at Philadelphia, in the county of Philadelphia and State of Pennsylvania, have invented certain new and useful Improvements in Individual Coffee Urns or Percolators; and I do hereby declare the following to be a full, clear, and exact description of the invention, such as will enable others skilled in the art to which it appertains to make and use the same.

My invention relates to individual coffee urns or percolators; and the improvement consists in constructing the percolator so that when in use it may be placed over or upon the cup from which the coffee is to be drunk, thus making the coffee-cup serve as a receptacle to receive the prepared coffee as it filters through. By this means the necessity of an additional receptacle is avoided, and keepers of restaurants, eating-saloons, &c., are enabled, with no additional expense or trouble, and easily and quickly, to give to each customer a freshly-made cup of coffee.

Figure 8:
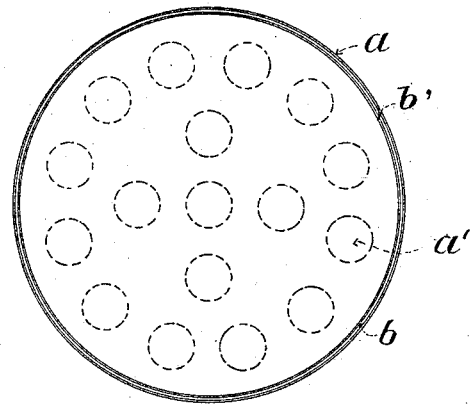
Figure 9:
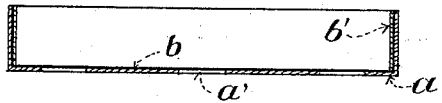

In the accompanying drawings, Figure 1 is an elevation of my improved percolator placed in position on top of an ordinary coffee-cup. Fig. 2 is an end elevation of the perforated cap containing the strainer removed from the bottom of the percolator. Figs. 5, 6, 7 are detailed views of the parts forming the removable strainer. Figs. 3 and 4 are respectively an elevation and a section showing a modification of Fig. 1. Figs. 8 and 9 are respectively an inside plan and a cross-section of the perforated cap showing the strainer adjusted therein.

A represents the body of the percolator, which is preferably made conical in shape; B, an ordinary coffee-cup.

D is a flat circular disk or flange secured around the lower part of the body A, serving as a support for the percolator and cover for the cup.

C is a top or cover, which may be movable, as shown in Fig. 1, or soldered tight, as shown in Figs. 3 and 4. If soldered tight, the air or vent tube c is necessary for the purpose of admitting air and allowing the water to percolate freely through the coffee. The vent-tube c is quite small, and has an opening, c', in the body of the percolator. It also extends beyond the flange D.

d is a handle on the percolator.

a is a movable tin cap, made after the style of an ordinary tin box-lid.

a' are perforations in the tin cap.

b is a circular piece of muslin or similar fabric, through which the coffee is filtered.

b' is a circular band about half an inch wide and made of sheet-tin.

To form the strainer the circular piece of muslin b is placed over the ring or band b', and the perforated lid a forced over both. The ring or band b' and the turned-up edge of the lid a fitting snugly together, they thus hold the muslin in position between them with the perforated cap outside. (See Fig. 2.) After the muslin has been fitted into the cap, the said cap is adjusted over the projecting end of the body A, which it fits snugly, and from which it can readily be removed without disturbing the muslin strainer. The perforated tin cap, with the muslin strainer therein, being fitted to the body of the percolator, and the whole placed in position on the top of the cup, as shown in Fig. 1, to make a cup of coffee it is only necessary to remove the cover C, put in a sufficient quantity of ground coffee, and pour upon it boiling water. Then replace the cover C and allow the water to percolate through the coffee into the cup beneath. The circular flange D, fitting over the top of the cup, besides serving as a support for the percolator, forms a cover for the cup, thus retaining the heat and preventing the delicate properties of the coffee from passing off. The flange is made large enough to fit over any ordinary cup.

When using the modified form, as shown in Figs. 3 and 4, the position of the percolator is reversed and the coffee placed therein and the water poured thereon before adjusting the perforated cap containing the strainer, after which the percolator is turned over on the cup in the position shown in Fig. 1. The perforated cap a being fitted over the muslin strainer, forms a protection therefor, and the perforations allow the prepared coffee to freely percolate through the muslin strainer in the cup beneath. When the strainer b is worn out from use or any other cause, it is taken out by removing the circular band b', a new strainer being adjusted in the manner hereinbefore described. The snug fit of the perforated cap containing the strainer will under ordinary circumstances hold the said cap in position on the projecting end of the body A; but, if desired, any convenient fastening may be adjusted for additional security. The body A may be made long enough to extend below the flange D, thus forming the projection over which the cap a, containing the strainer, is fitted; or the projection for said cap may be made on the under side of the flange D, and integral therewith, in which case, if desired, the body A may be made large enough to extend over the top of the cup, the flange D thus forming the base or bottom therefor.

Having thus described my invention, what I claim as new is—

1. In an individual coffee-percolator, the body A, provided with a suitable strainer at the bottom thereof, in combination with the encircling flange or disk D, said flange or disk supporting the percolator over the cup B, and forming a cover therefor, substantially as shown.

2. In combination with the cup B, the individual coffee-percolator consisting of a cover, C, and body A, having a suitable strainer over the bottom opening, and provided with a base extending over the upper edge of said cup, and supported thereon, substantially as described.

3. A coffee-percolator consisting of the cover C, body A, projecting or extending below an encircling flange, D, and a strainer adjusted over the opening of the part projecting below said encircling flange, substantially as shown.

4. In a coffee-percolator, the body A, having the cover C and encircling flange D, in combination with the perforated cap a, provided with the strainer b, substantially as described.

5. In a coffee-percolator, the cover C and body A, provided with a suitable strainer over the bottom opening thereof, in combination with the encircling flange D and cup B, substantially as and for the purpose described.

6. In a coffee-percolator, the body A, having secured thereon the cover C, and provided with a suitable strainer over the bottom opening, in combination with the flange D and vent-tube c, said vent-tube opening into the body of the percolator at or near the top thereof, and extending downward below the flange D, or even with the under surface thereof, substantially as shown and described.

7. In a coffee-percolator, the body A, having the top C, securely fastened thereon, and provided with the vent-tube c, in combination with the encircling flange D and movable perforated cap a, provided with a suitable strainer, substantially as shown.

8. A strainer for coffee-percolators, consisting of the perforated cap a, woven fabric b, and ring b', adapted to be fitted together and secured to the bottom of the percolator, substantially as shown.

In testimony whereof I affix my signature in presence of two witnesses.

THOMAS D. MOWLDS.

Witnesses:
  OTIS EGAN,
  EDWARD LYSTER, Jr.